(12) United States Patent
Lee

(10) Patent No.: US 7,663,819 B2
(45) Date of Patent: Feb. 16, 2010

(54) LENS BARREL ASSEMBLY OF CAMERA MODULE AND LASER APPARATUS FOR ASSEMBLING THE SAME

(75) Inventor: Young Ho Lee, Gyunggi-do (KR)

(73) Assignee: Samsung Electro-Mechanics Co., Ltd, Suwon (KR)

( * ) Notice: Subject to any disclaimer, the term of this patent is extended or adjusted under 35 U.S.C. 154(b) by 85 days.

(21) Appl. No.: 11/905,749

(22) Filed: Oct. 3, 2007

(65) Prior Publication Data

US 2008/0094738 A1  Apr. 24, 2008

(30) Foreign Application Priority Data

Oct. 10, 2006  (KR) .................... 10-2006-0098594

(51) Int. Cl.
*G02B 7/02* (2006.01)
*G02B 15/14* (2006.01)
(52) U.S. Cl. ................. 359/819; 359/700; 359/704
(58) Field of Classification Search ......... 359/694–704, 359/819–824, 829
See application file for complete search history.

(56) References Cited

U.S. PATENT DOCUMENTS

2006/0077575 A1  4/2006  Nakai et al. ............... 359/819
2008/0094738 A1*  4/2008  Lee ........................... 359/829

FOREIGN PATENT DOCUMENTS

JP  2005-30061  10/2005
KR  10-2006-0094247  8/2006

OTHER PUBLICATIONS

Chinese Office Action issued on Mar. 27, 2009 in corresponding Chinese Patent Application 200710162298.6.

* cited by examiner

*Primary Examiner*—Mohammed Hasan

(57) ABSTRACT

A lens barrel assembly of a camera module and a laser apparatus for assembling the lens barrel assembly are provided. The lens barrel assembly of a camera module includes: at least one lens; a barrel provided with a lens exposing hole having a predetermined size which is formed to penetrate a central portion of a closed upper surface of the barrel, wherein the lens is inserted from an lower opening of the barrel toward the lens exposing hole; and a stopping protrusion which is formed by fuse-securing a fused material on a boundary region between an outer circumference of the lens and an opened inner surface of the barrel by illumination of a laser beam on the opened inner surface of the barrel.

4 Claims, 9 Drawing Sheets

LENS BARREL ASSEMBLY OF CAMERA MODULE AND LASER APPARATUS FOR ASSEMBLING THE SAME

CROSS-REFERENCE TO RELATED APPLICATIONS

This application claims the priority of Korean Patent Application No. 2006-98594 filed on Oct. 12, 2006, in the Korean Intellectual Property Office, the disclosure of which is incorporated herein by reference.

BACKGROUND OF THE INVENTION

1. Field of the Invention

The present invention relates to a lens barrel assembly of a camera module and a laser apparatus for assembling the lens barrel assembly and, more particularly, to a lens barrel assembly of a camera module capable of improving workability and productivity by conveniently and speedily performing a process of permanently assembling a lens with a barrel without a pressing-ring process, a bonding coating process, or a bonding curing process and reducing production cost by reducing the number of parts and a laser apparatus for assembling the lens barrel assembly.

2. Description of the Related Art

Generally, in a current portable communication terminal such as a mobile phone, PDA (personal digital assistant), and a portable PC (personal computer), transmission of text, voice, and image data have been widely used.

Under the circumstances, a camera module for transmission of image data or image chatting is provided as a basic module to the current portable communicant terminal.

FIG. 1 is a perspective exploded view illustrating a general camera module 1. The camera module 1 includes a lens barrel assembly 10 in which a lens L is disposed. The lens barrel assembly 10 includes a barrel 10a of which outer surface is provided with a male screw 11 and a pressing ring 10b which is coupled with an upper end of the barrel 10a to secure the lens L. A light incident hole 13, that is, a lens exposing hole is formed on a central region of an closed upper surface of the barrel 10a to penetrate the upper surface The lens barrel assembly 10 is coupled with a housing 20 having an inner cylindrical space. An inner surface of the inner cylindrical space is provided with a female screw 21 that is engaged with the female screw 11 of the barrel 10a. An IR filter 25 which filters light transmitting the lens L is disposed on a bottom of the inner cylindrical space.

A board 40 on which an image sensor 30 having an imaging region for imaging an object from the light transmitting the lens L is mounted is disposed under the housing 20. The lower end of the housing 20 is mounted on the one end portion of the board 40, and a connector 45 which is electrically connected to a display means (not shown) is provided to the other end portion of the board 40.

In a case where the image sensor 30 is subject to flip-chip bonding, a window 42 for exposing the imaging region is formed to be opened in the one end portion of the board 40.

A process of assembling the lens or a plurality of the lenses in the lens barrel assembly 10 of the camera module 1 is as follows. As shown in FIGS. 2 and 3, a lower-end of the barrel 10a is faced up, and a plurality of the lenses are sequentially inserted and stacked in the arrow direction A from the upper portion to the lower portion of the barrel 10a. At this time, a spacer(s) 15 is disposed so as to maintain an interval between the lenses L.

Next, the pressing ring 10b is pressed and coupled with the opened lower end of the barrel 10a so as to secure the lenses L stacked in the barrel 10a, so that the temporarily-assembled lens barrel assembly 10 in which the lenses are temporarily assembled is obtained.

As shown in FIG. 3A, the lens barrel assembly 10 in which the lenses L stacked in the barrel 10a is temporarily secured by the pressing ring 10b is mounted on a binding jig (not shown). Next, while the lens barrel assembly is rotated in the arrow direction C, a boundary region between the inner surface of the barrel 10a and the outer surface of the pressing ring 10b is uniformly coated with a UV bonding material 9 by using a dispenser 3. Next, a UV curing process is performed.

As shown in FIG. 3B, in the UV curing process, the UV bonding material 9 coated in the lens barrel assembly 10 is cured by a UV beam illuminated from a UV lamp 6 which is disposed corresponding to the UV bonding material 9, so that the permanently-assembled lens barrel assembly 10 in which the pressing ring 10b is permanently secured to the barrel 10a is obtained.

In the conventional process of permanently securing the pressing ring 10b to the barrel 10a in which the lenses L are stacked, the pressing ring 10b is forcibly pressed and inserted into the lower-end inner surface of the barrel 10a. Therefore, the assembling task is very complicated, and excessively long time is taken to perform the assembling task. In addition, various assembling defects may occur.

SUMMARY OF THE INVENTION

As aspect of the present invention provides a lens barrel assembly of a camera module capable of improving workability and productivity by conveniently and speedily performing a process of permanently assembling a lens with a barrel without a process of pressing a pressing ring, a bonding coating process, or a bonding curing process and reducing production cost by increasing the number of cavities of a mold and a laser apparatus for assembling the lens barrel assembly.

According to an aspect of the present invention, there is provided a lens barrel assembly of a camera module, comprising: at least one lens; a barrel provided with a lens exposing hole having a predetermined size which is formed to penetrate a central portion of a closed upper surface of the barrel, wherein the lens is inserted from an lower opening of the barrel toward the lens exposing hole; and a stopping protrusion which is formed by fuse-securing a fused material on a boundary region between an outer circumference of the lens and an opened inner surface of the barrel by illumination of a laser beam on the opened inner surface of the barrel. The barrel may be formed as a screwless hollow-cylindrical member of which outer surface is not provided with a screw.

The barrel may be formed as a hollow-cylindrical member of which outer surface is provided with a male screw.

The barrel may further comprise spacers which are disposed between adjacent lenses to maintain an interval.

At least two stopping protrusions may be formed in the boundary region between the outer circumference of the lens and the inner surface of the barrel in a circumferential direction.

According to another aspect of the present invention, there is provided a laser apparatus for assembling a lens barrel assembly, wherein the lens barrel assembly comprises a barrel into which at least one lens is inserted so that a boundary region between an outer circumference of the lens and an inner surface of the barrel is exposed, and wherein the laser apparatus comprises: a mounting jig on which the lens barrel assembly is mounted; a laser generator which generates a laser beam having a specific frequency range and is electrically connected through an optical-fiber cable to a laser output terminal which is disposed to face the boundary region of the lens barrel assembly and illuminate the laser beam on the boundary region; an angle adjusting unit which rotates the laser output terminal toward the boundary region; and a distance adjusting unit which moves the angle adjusting unit forward and backward on the mounting jig to adjust a distance between the angle adjusting unit and the lens barrel assembly.

The mounting jig may be formed on an upper surface of a base disposed on a bottom surface, and the mounting jig may be provided with a mounting opening having a predetermined depth in which the lens barrel assembly is mounted.

The laser output terminal may illuminate any one of a solid-state laser, a gas-state laser, and a liquid state laser.

The angle adjusting unit may comprise: a moving member which is assembled with the mounting jig to be moved in the forward and backward directions; and a fixing member which is assembled with the moving member through a hinge to fix the laser output terminal.

The distance adjusting unit may comprise: a fixing screw which is fixed on mounting jig; and a screw member which is screw-coupled with a female screw formed on the fixing screw and of which distal end is in contact with the angle adjusting unit.

BRIEF DESCRIPTION OF THE DRAWINGS

The above and other aspects, features and other advantages of the present invention will be more clearly understood from the following detailed description taken in conjunction with the accompanying drawings, in which:

FIG. 3 illustrates states of the conventional lamp where the lens barrel assembly is permanently assembled.

DETAILED DESCRIPTION OF THE PREFERRED EMBODIMENT

Hereinafter, exemplary embodiments of the present invention will now be described in detail with reference to the accompanying drawings.

Figure 1:
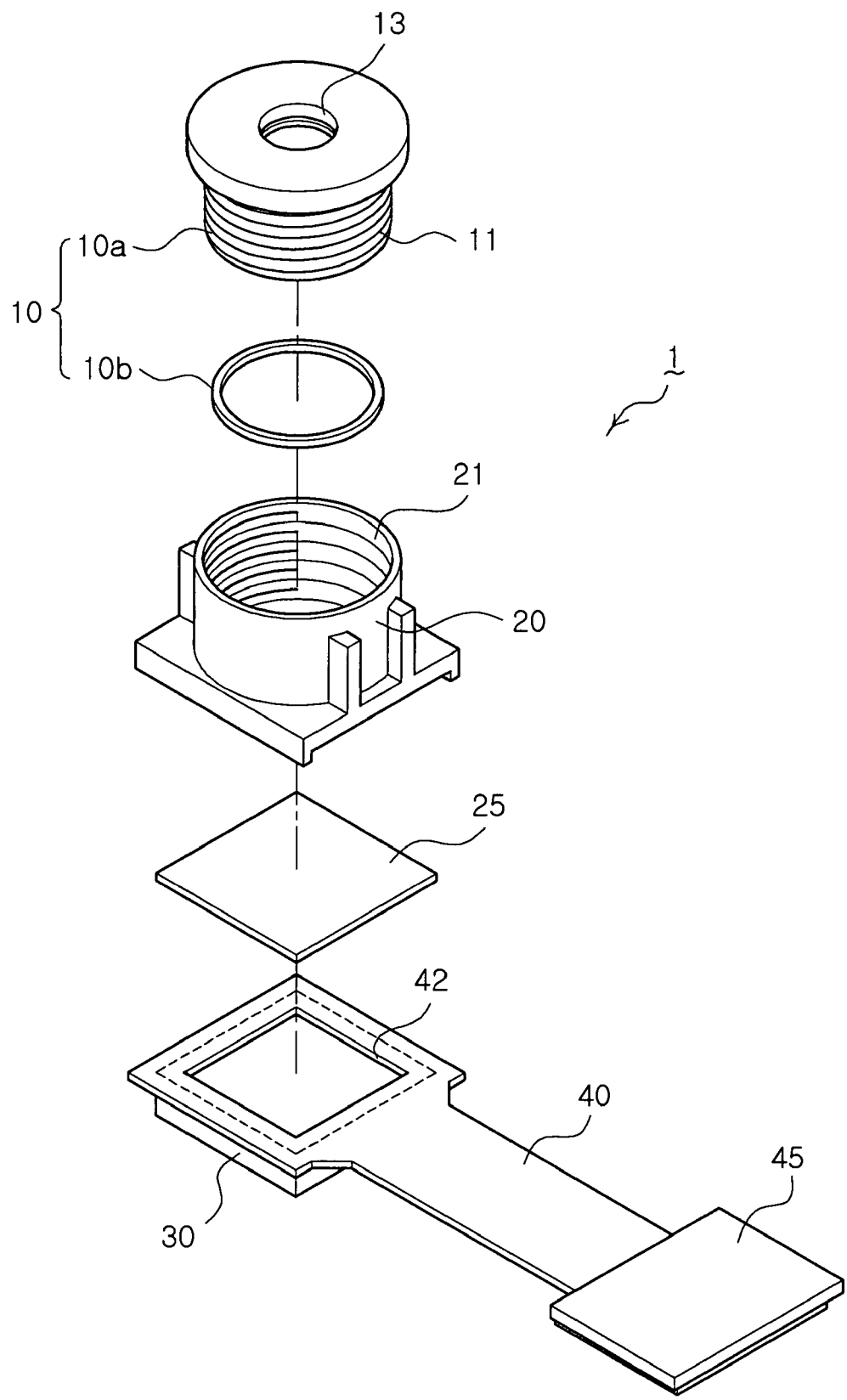
FIG. 1 is a perspective exploded view illustrating a general camera module.
Figure 2A:
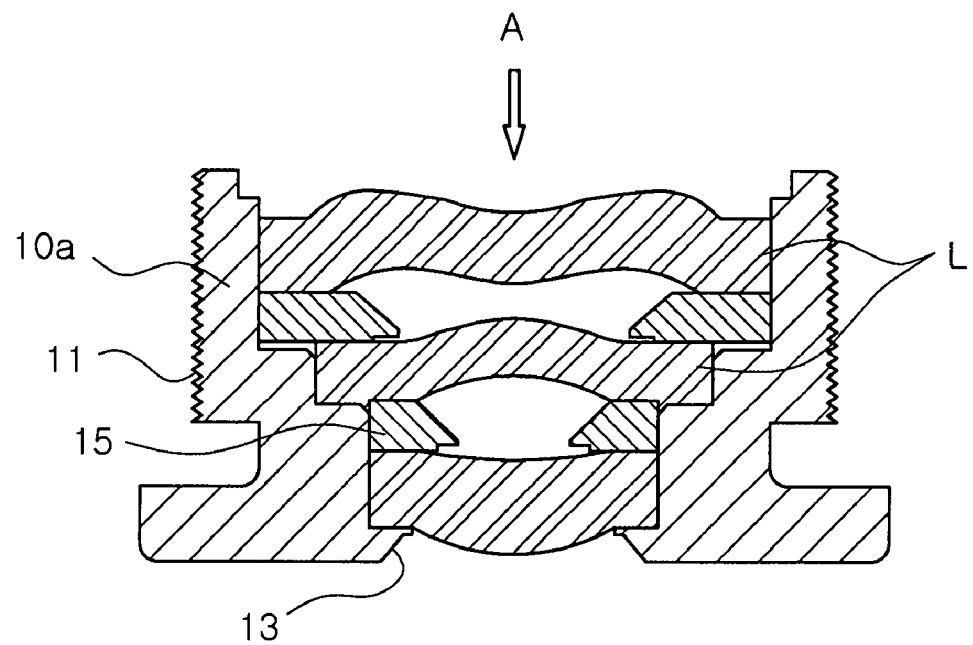
FIG. 2A is a view illustrating a state that a lens is stacked on a barrel, and FIG. B is a view illustrating a state that a pressing ring is pressed and inserted into the barrel.
Figure 2B:
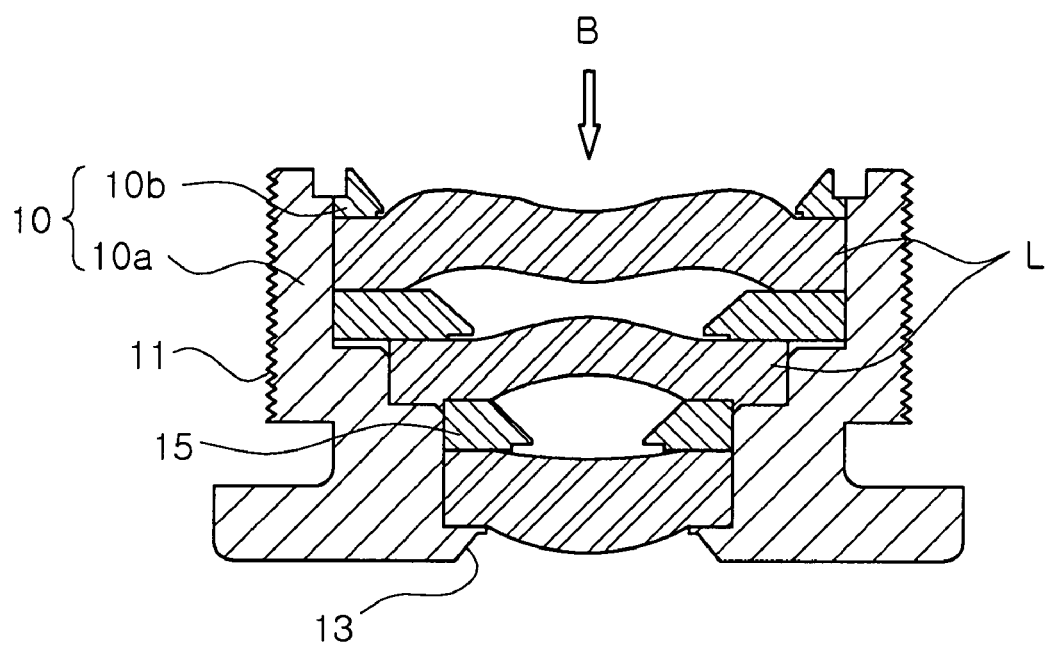
FIG. 2 illustrates states of a conventional lamp where a lens barrel assembly is temporarily assembled.
Figure 3A:
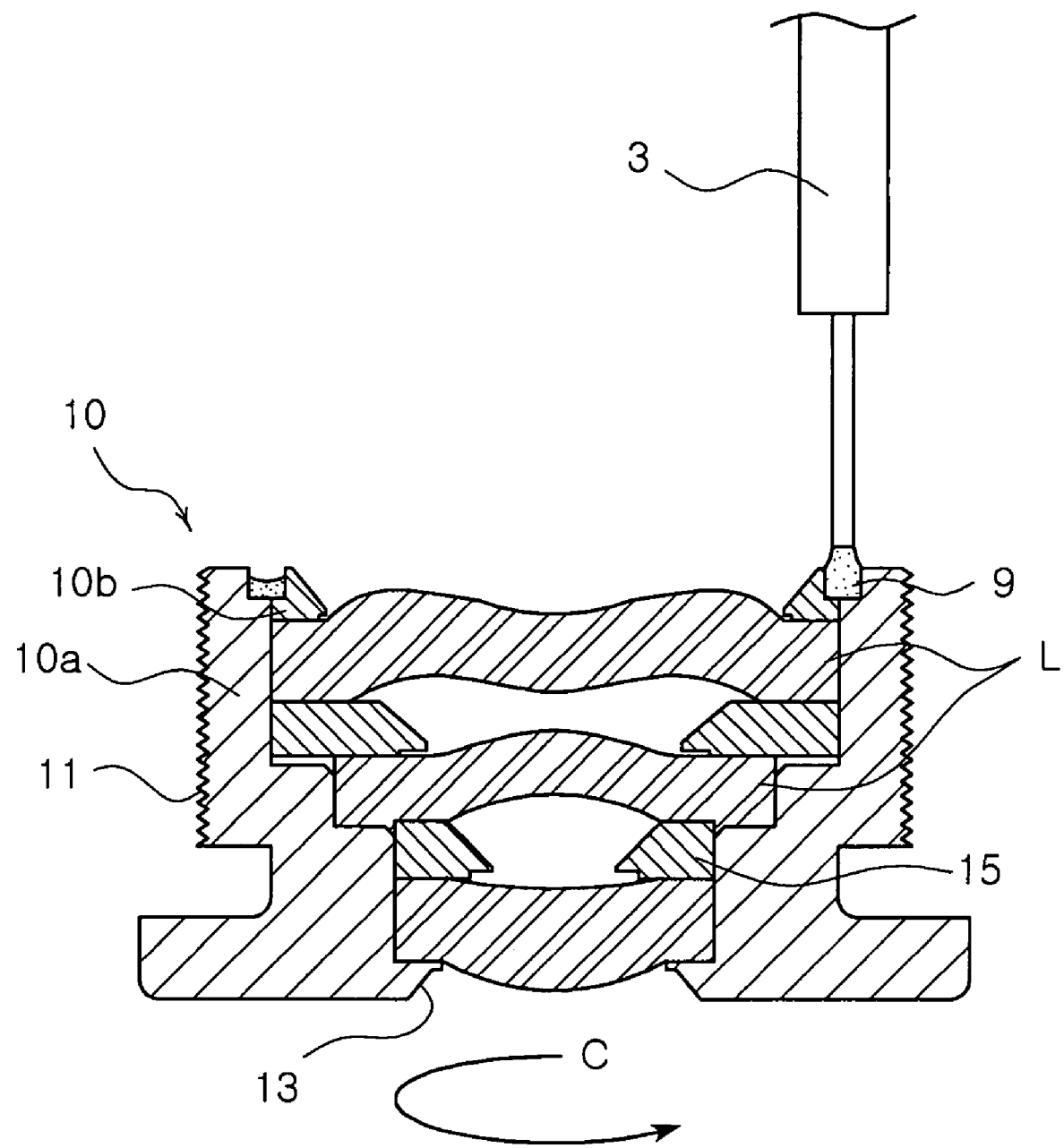
FIG. 3A is a view illustrating a state that a UV bonding material is coated between the barrel and the pressing ring.
Figure 3B:
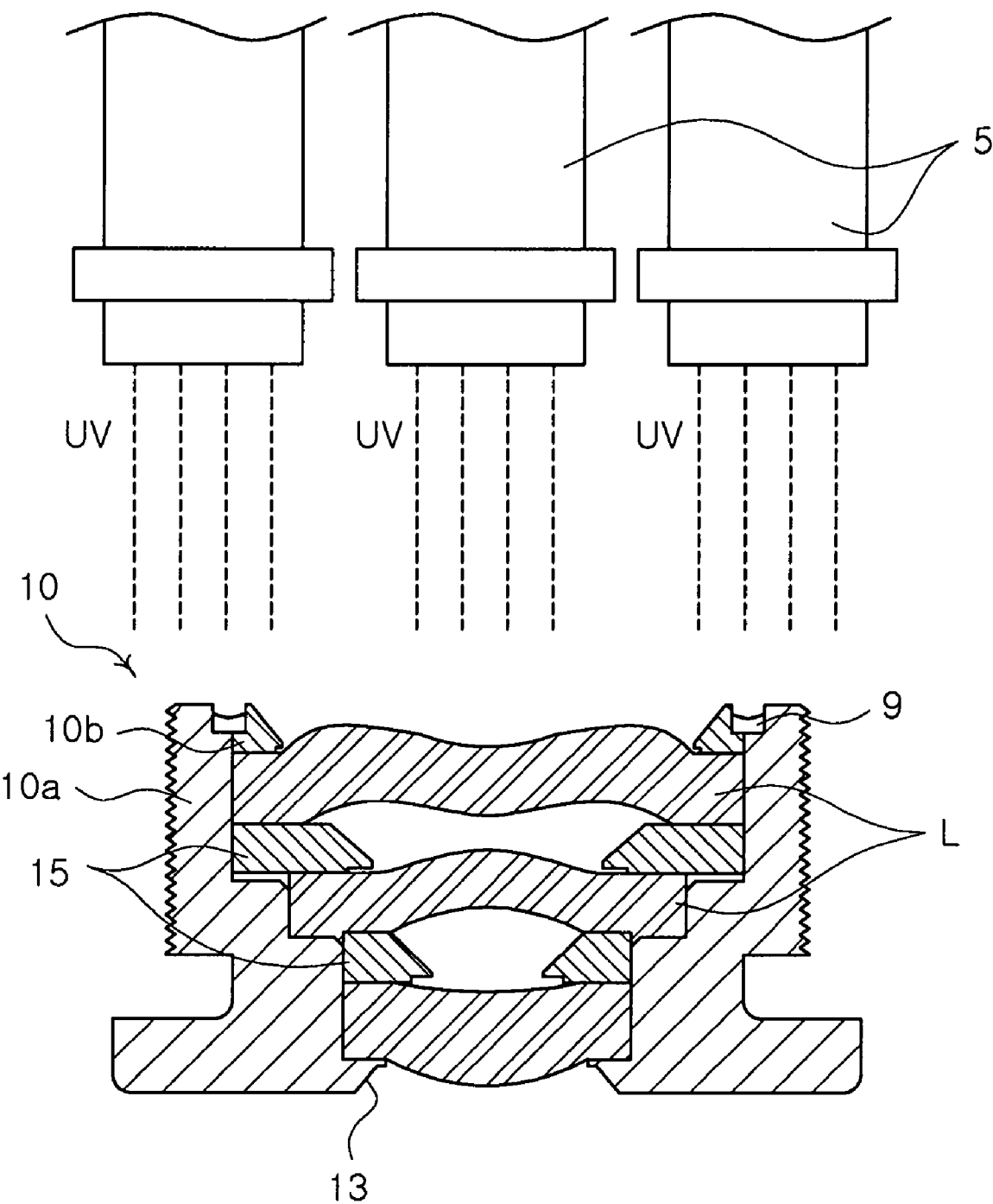
FIG. 3B is a view illustrating a state that the coated UV bonding material is cured.
Figure 4:
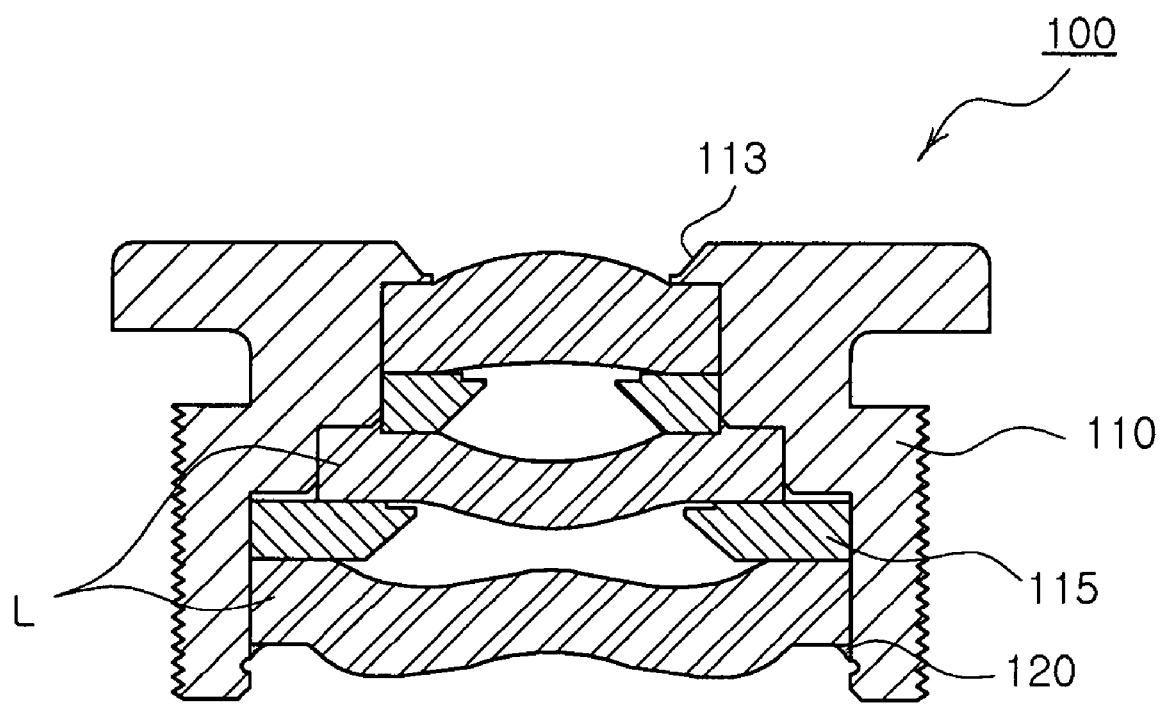
FIG. 4 is a view illustrating a construction of a lens barrel assembly of a camera module according to the present invention.
Figure 5:
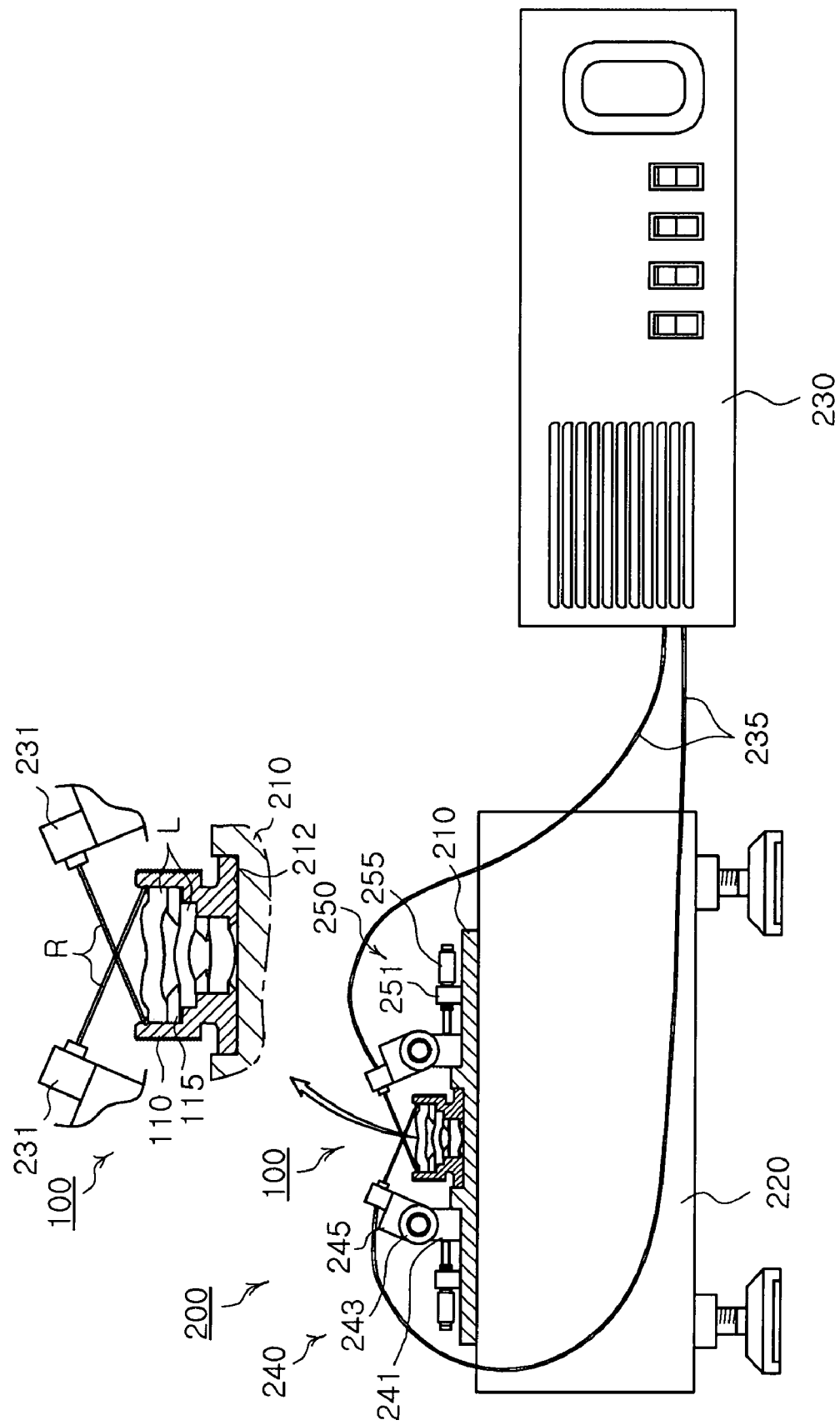
FIG. 5 is a view illustrating a process of fuse-securing the lens barrel assembly of the camera module by using a laser apparatus.

FIG. 4 is a view illustrating a construction of a lens barrel assembly of a camera module according to the present invention. FIG. 5 is a view illustrating a process of fuse-securing the lens barrel assembly of the camera module by using a laser apparatus.

As shown in FIGS. 4 and 5, the lens barrel assembly 100 according to the present invention includes a barrel 100 and a stopping protrusion 120.

The barrel 110 is a hollow-cylindrical lens receiving member, in which at least one lens L is inserted in a direction from a lower portion to an upper portion of the barrel 110 to be stacked. The barrel 110 is made of a resin.

A lens exposing hole having a predetermined size is formed to penetrate a central portion of a closed upper surface of the barrel 110. The lens exposing hole exposes the uppermost lens among a plurality of the lenses L stacked in the barrel 110.

According to the coupling manner of coupling the barrel 110 with the housing 20, a male screw may be formed on the outer surface of the body of the barrel 110, or the outer surface thereof may be formed in a screwless shape. Namely, in a case where the barrel 110 is coupled with the housing 20 in the screw coupling manner, the male screw of the outer surface of the body of the barrel 110 is engaged with a female screw of the housing 20. In a case where the barrel 110 is coupled with the housing 20 in a screwless coupling manner, the outer surface thereof may be formed in a screwless shape.

The barrel 110 may be provided with an iris diaphragm (not shown) together with a plurality of the lenses L. The iris diaphragm is disposed between the stacked lens L and an adjacent lens.

Preferably, spacers 115 are additionally disposed between the lenses L so as to maintain predetermined intervals therebetween.

The lens may be substituted with an IR filter which filters infrared light. The IR filter may be disposed in an intermediate layer or the lowermost layer of the barrel 110, which corresponds to a lens different from the aforementioned lens L.

The stopping protrusion 120 is formed to protrude inward from the boundary region of the outer circumference of the lowermost-layer lens disposed in the barrel 110 and the inner surface of the barrel 110, so that the lenses can be permanently secured to the barrel 110.

The stopping protrusion 120 is formed by fusing a portion of the inner surface of the barrel 110 corresponding to a portion disposed just over the outer circumference of the lens L with illumination of the laser beam to form a fused material and fuse-securing the fused material on the boundary region between the inner surface of the barrel 110 and the outer circumference of the lens L.

In the embodiment, the stopping protrusion 120 is formed continuously and uniformly in the circumferential direction on the boundary region between the inner surface of the barrel 110 and the outer circumference of the lens L. However, in this case, long time is taken to perform the assembling process. Alternatively, at least two stopping protrusions are formed in the circumferential direction with a predetermined interval. In this case, the stopping protrusions are preferably disposed in left/right symmetry about the optical axis.

As shown in FIG. 5, the closed upper-end of the barrel 110 on which the lens exposing hole 113 is formed is faced down, and a plurality of the lens L are inserted into the opened lower-end of the barrel 110, so that a temporarily-assembled lens barrel assembly 100 is obtained. The temporarily-assembled lens barrel assembly 100 is illuminated with a laser beam as a heat source generated by the laser apparatus 200, so that the permanently-assembled lens barrel assembly 100 is obtained.

The laser apparatus 200 includes a mounting jig 210, a laser generator 230, an angle adjusting unit 240, and a distance adjusting unit 250.

The mounting jig 210 is provided with a mounting opening 212 having a predetermined depth so that the lens barrel assembly 110 can be vertically disposed in the central region of the upper surface thereof. In addition, the closed upper surface of the barrel 110 on which the lens exposing hole 113 is formed is in contact with the mounting opening 212. Preferably, the mounting jig 210 is disposed on an upper surface of a base 220 stably disposed on a bottom surface.

The laser generator 230 is connected to a laser output terminal 231 which faces the boundary region between the inner surface of the barrel 110 and the outer circumference of the lens of the lens barrel assembly 100 mounted on the mounting jig 210. The laser output terminal 231 is connected through an optical-fiber cable.

When a power is supplied to the laser generator 230, the inner surface of the barrel 110 is intensively illuminated with the laser beam having a specific frequency range which is generated by the laser generator 230 and transmitted through the optical-fiber cable 230 to the laser output terminal 231. Therefore, a portion of the inner surface of the barrel made of a resin is fused, and the fused material is fuse-secured on the boundary region between the inner surface of the barrel 110 and the outer circumference of the lens L, so that the stopping protrusion 120 for permanently securing and stopping the lens L disposed in the barrel 110 is formed.

The laser generator 230 includes a laser generating unit for generating a laser beam having a predetermined frequency range, a power supply, and a ballast for stabilizing the laser beam into a suitable frequency range.

The angle adjusting unit 240 adjusts the illumination angle of the laser beam by rotating the distal end of the laser output terminal 231 (that illuminates the laser beam generated by the laser generator 230) toward the boundary region between the inner surface of the barrel f110 and the outer circumference of the lens L.

Figure 6:
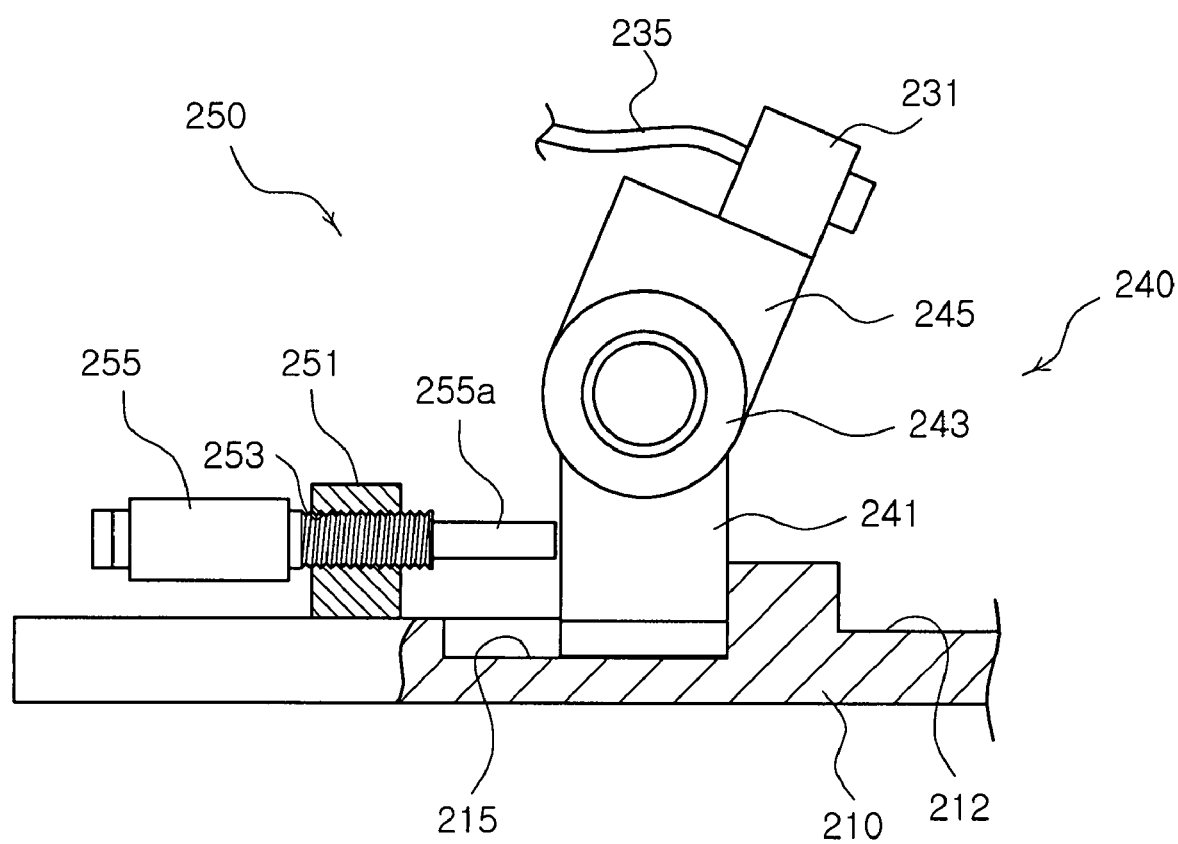
FIG. 6 is a detailed view illustrating an angle adjusting unit and a distance adjusting unit of a laser apparatus for assembling a lens barrel assembly according to the present invention.
Figure 7:
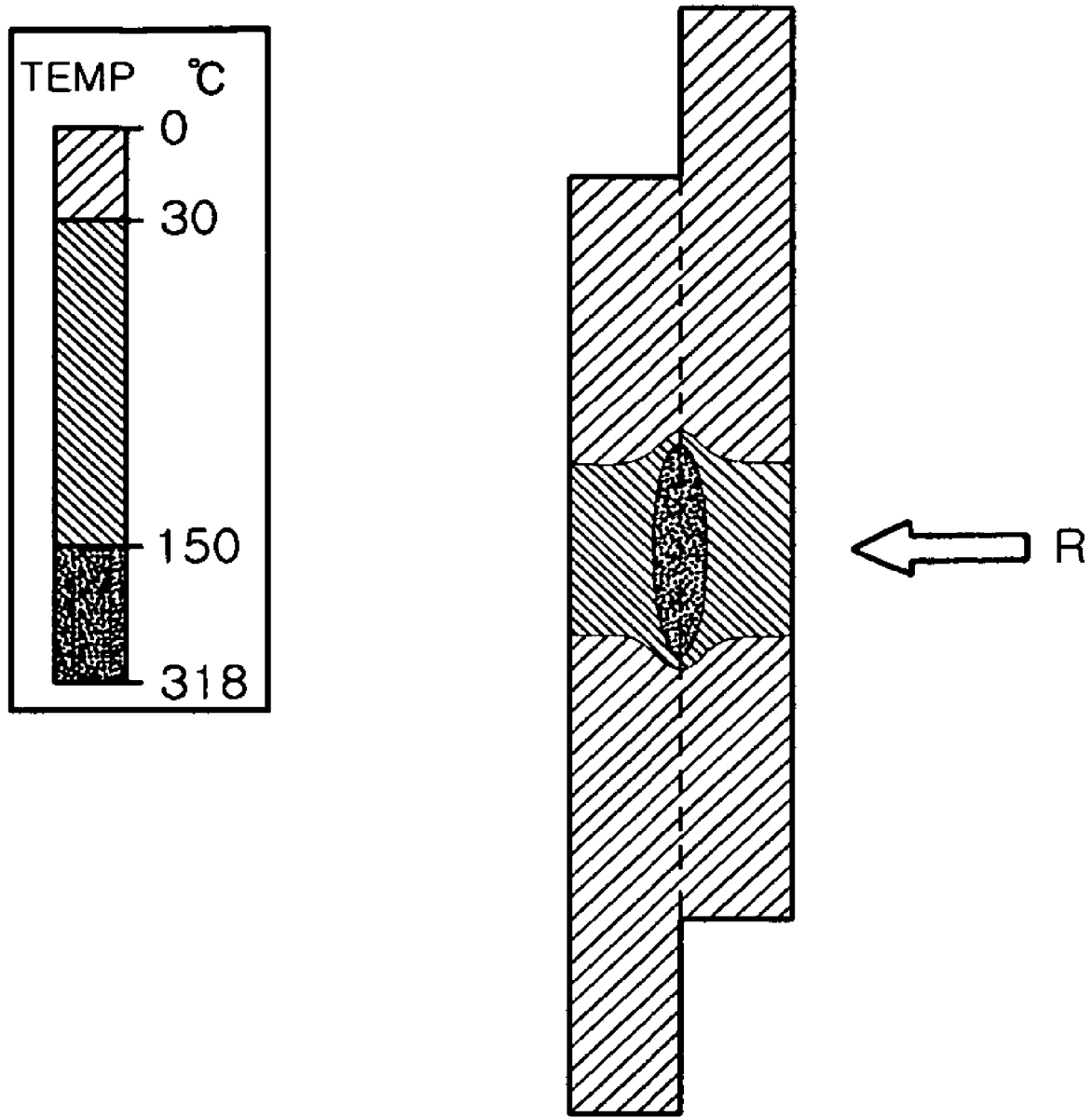
FIG. 7 illustrates a fuse-secured state of an overlapped region of a barrel and a pressing ring according to a temperature.

As shown in FIG. 6, the angle adjusting unit 240 includes a moving member 241 which is assembled with a guide groove 215 formed on the upper surface of the mounting jig 210 to be moved in the forward and backward directions. An upper end of the moving member 241 is connected through a hinge 243 to a fixing member 245. The laser output terminal 231 is provided to an upper end of the fixing member 245 which a lower end of the hinge 243 is rotatably assembled with.

Accordingly, the fixing member 245 is rotated about the hinge 243 (as a rotation shaft) toward the lens barrel assembly 100 mounted on the mounting jig 210 by a suitable angle, so that the illumination angle of the laser beam can be adjusted.

The distance adjusting unit 250 moves the angle adjusting unit 240 forward or backward on the mounting jig 210, so that a horizontal distance of the lens barrel assembly 110 and the angle adjusting unit 240 can be adjusted.

As shown in FIG. 6, the distance adjusting unit 250 is provided with a fixing member 251 which is vertically fixed on the mounting jig 210 and a screw member 255 having a predetermined length which is engaged with a female screw 253. An end of the screw member 255 is in contact with the moving member 241 of the angle adjusting unit 240.

By screwing the screw member 255, the angle adjusting unit 240 is moved forward along the guide groove 215 to the lens barrel assembly 110.

Now, processes for permanently assembling the temporarily-assembled lens barrel assembly 100 in which the lens is inserted into the barrel 110 by using the laser apparatus 200 is described. Firstly, as shown in FIG. 5, the temporarily-assembled lens barrel assembly 100 is vertically mounted on the mounting hole 212 of the mounting jig 210. The boundary region between the inner surface of the barrel 110 and the outer circumference of the lens L is exposed. The laser output terminal 231 loaded on the angle adjusting unit 240 is disposed to face the boundary region in a predetermined separation distance at a level higher than the barrel 110.

The illumination angle of the laser beam illuminated from the laser output terminal 231 is adjusted by using the angle adjusting unit 240, and the distance between the angle adjusting unit 240 and the lens barrel assembly 100 is suitably adjusted by using the distance adjusting unit 250.

Subsequently, the laser generator 230 is powered on to generate a laser beam having a specific frequency range. The laser beam is transmitted through the optical-fiber cable 235 to the laser output terminal 231 that is coupled with the end of the optical-fiber cable 234, so that the laser beam is emitted from the laser output terminal 231.

Therefore, as shown in FIG. 5, the illumination of the laser beam illuminated from the laser output terminal 231 is concentrated on the specific portion of the inner surface of the barrel 110, so that the specific portion of the barrel 110 made of a resin is fused by the laser beam as a heat source. The fused material is flow down due to its gravity, so that the fused material is fuse-secured on the boundary region between the inner surface of the barrel 110 and the outer circumference of the lens L. Accordingly, the stopping protrusion 120 for preventing the lenses from being separated is formed.

Namely, the specific portion of the inner surface of the lens barrel assembly 100 facing the laser output terminal 231 is fuse-secured by the laser beam R illuminated from the laser output terminal 231. Only the localized bonding portion, that is, the specific portion illuminated with the laser beam R is heated up to a fusing temperature of 150° C. or more of a heat-resistant extracting resin constituting the barrel 110, and preferably, the specific portion is maintained in a heating temperature range of 150 to 300° C. so that the bonding portion is fused and secured. The increase in temperature is concentrated on the bonding portion, that is, the specific portion illuminated with the laser beam. Therefore, deformation does not occur in a region except for the fuse-secured portion.

The laser output terminal 215 that illuminates the laser beam R has a diameter of 0.5 to 3 φ. The laser output terminal 215 is provided to the end of an optical-fiber cable 235 which includes a bundle of optical fibers.

The frequency of the laser beam R illuminated from the laser output terminal 231 is set to be in a specific frequency range so that only the specific portion of the barrel 110 which is extracted and molded from a heat-resistant resin can be fuse-secured. Any one of a solid-laser beam, a gas-laser beam, and a liquid-laser beam can be selected according to the set frequency range.

Figure 8A:
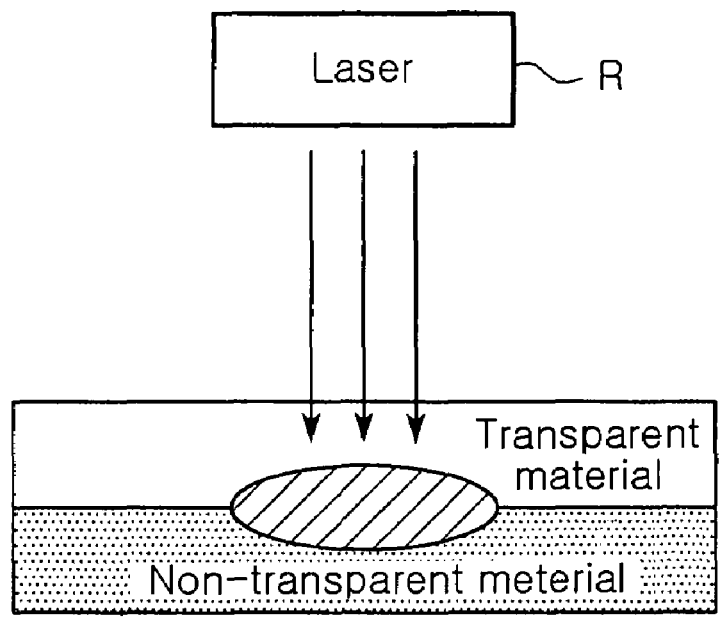
FIGS. 8A and 8B are schematic views illustrating bonding configurations between different-type materials and between the same-type materials in the lens barrel assembly, respectively.
Figure 8B:
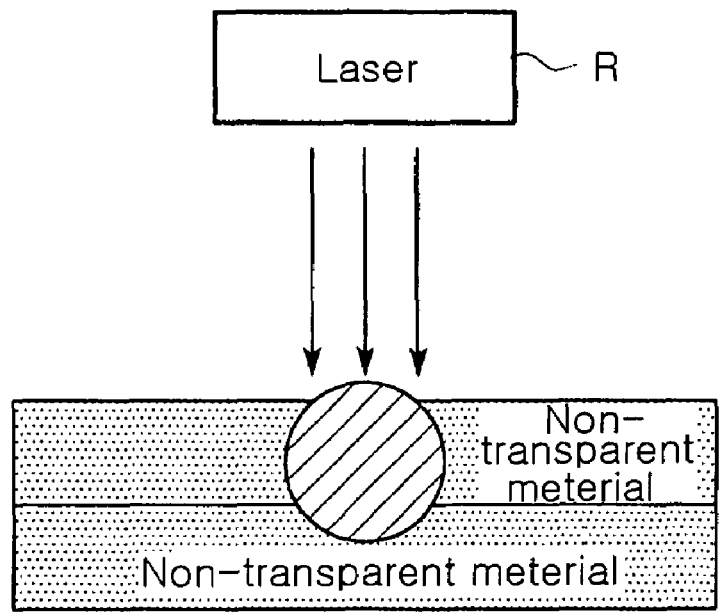

FIGS. 8A and 8B are schematic views illustrating bonding configurations between different-type materials and between the same-type materials in the lens barrel assembly, respectively.

A transparent member transmits the laser beam R illuminated from the laser output terminal 231, and the illuminated portions of the non-transparent members are fused by the laser beam R. Therefore, as shown in FIG. 8A, in a case where the different-type materials, that is, the transparent member and the non-transparent member are bonded by illumination of the laser beam R, only the non-transparent member is fused by the laser beam R transmitting the transparent member.

On the other hand, as shown in FIG. 8B, in a case where the same-type materials, that is, the non-transparent members are bonded by illumination of the laser beam R, both the non-transparent members are fused by the laser beam R, so that the fusing is formed from the illuminated surface of the first non-transparent member down to a portion of the second non-transparent member. Therefore, the same-type material members can be more strongly fuse-secured.

Preferably, the frequency of the laser beam R is adjusted in a suitable frequency range so that the only illuminated portion can be fused to bond the same-type members or the different-type members.

Next, in a case where the lens barrel assembly 100 assembled by performing the laser fuse-securing process using the laser apparatus 200 is not provided with the male screw on the outer surface of the body of the barrel 110, the lens barrel assembly 100 is inserted into the housing 20 in the optical-axis direction and coupled with the inner surface thereof in the screwless coupling manner. On the other hand, in a case where the lens barrel assembly 100 is provided with the male screw on the outer surface of the body of the barrel 110, the lens barrel assembly 100 is coupled with the inner surface thereof in the screw coupling manner.

Finally, the board 40 on which the image sensor 30 is mounted in a flip-chip bonding manner or a wire bonding manner is provided on the lower end of the housing 20 in which the lens barrel assembly is coupled in the screwless or screw coupling manner, so that the camera module 1 is manufactured.

According to the present invention, a lens is permanently assembled with a barrel by fuse-securing only a specific portion of an inner surface of the barrel in which at least one lens is disposed with illumination of a laser beam as a heat source emitted from a laser output terminal to form a stopping protrusion on a boundary region between the inner surface of the barrel and an outer circumference of the lens. Therefore, unlike a conventional lens barrel assembly, the process of permanently assembling the lens with the barrel is conveniently and speedily performed without a process of forcibly pressing a pressing ring, a bonding coating process, or a bonding curing process, so that it is possible to effectively improve workability and productivity.

In addition, the number of parts constituting the lens barrel assembly can be reduced, so that it is possible to reduce production cost.

While the present invention has been shown and described in connection with the exemplary embodiments, it will be apparent to those skilled in the art that modifications and variations can be made without departing from the spirit and scope of the invention as defined by the appended claims.

What is claimed is:

1. A lens barrel assembly of a camera module, comprising:
   at least one lens;
   a barrel provided with a lens exposing hole having a predetermined size which is formed to penetrate a central portion of a closed upper surface of the barrel, wherein the lens is inserted from an lower opening of the barrel toward the lens exposing hole; and
   a stopping protrusion which is formed by fuse-securing a fused material on a boundary region between an outer circumference of the lens and an opened inner surface of the barrel by illumination of a laser beam on the opened inner surface of the barrel,
   wherein at least two stopping protrusions are formed in the boundary region between the outer circumference of the lens and the inner surface of the barrel in a circumferential direction.

2. The lens barrel assembly of claim 1, wherein the barrel is formed as a screwless hollow-cylindrical member of which outer surface is not provided with a screw.

3. The lens barrel assembly of claim 1, wherein the barrel is formed as a hollow-cylindrical member of which outer surface is provided with a male screw.

4. The lens barrel assembly of claim 1, wherein the barrel further comprises spacers which are disposed between adjacent lenses to maintain an interval.

* * * * *